(12) United States Patent
May

(10) Patent No.: US 6,910,391 B1
(45) Date of Patent: Jun. 28, 2005

(54) MAGNETIZED TORQUE TRANSDUCER ELEMENTS

(75) Inventor: Lutz Axel May, Gelting (DE)

(73) Assignee: Fast Technology GmbH (DE)

( * ) Notice: Subject to any disclaimer, the term of this patent is extended or adjusted under 35 U.S.C. 154(b) by 0 days.

(21) Appl. No.: 09/937,230

(22) PCT Filed: Mar. 23, 2000

(86) PCT No.: PCT/GB00/01103

§ 371 (c)(1),
(2), (4) Date: Jan. 24, 2002

(87) PCT Pub. No.: WO00/57150

PCT Pub. Date: Sep. 28, 2000

(30) Foreign Application Priority Data

Mar. 23, 1999 (GB) .............................. 9906735

(51) Int. Cl.$^7$ ............................................... G01L 3/02
(52) U.S. Cl. ............................ 73/862.333; 73/868.335
(58) Field of Search ............................ 73/862, 862.08, 73/862.333, 862.335

(56) References Cited

U.S. PATENT DOCUMENTS

| | | | |
|---|---|---|---|
| 4,697,460 A | 10/1987 | Sugiyama et al. | 73/862.335 |
| 4,896,544 A * | 1/1990 | Garshelis | 73/862.333 |
| 4,907,462 A * | 3/1990 | Obama et al. | 73/862.335 |
| 4,920,809 A | 5/1990 | Yoshimura et al. | 75/862.36 |
| 5,195,377 A * | 3/1993 | Garshelis | 73/779 |
| 5,351,555 A | 10/1994 | Garshelis | 73/862.335 |
| 5,412,999 A * | 5/1995 | Vigmostad et al. | 73/862.333 |
| 5,465,627 A | 11/1995 | Garshelis | 73/862.335 |
| 5,520,059 A | 5/1996 | Garshelis | 73/862.333 |
| 6,047,605 A * | 4/2000 | Garshelis | 73/862.336 |
| 6,260,423 B1 * | 7/2001 | Garshelis | 73/862.336 |
| 6,330,833 B1 * | 12/2001 | Opie et al. | 73/862.333 |

FOREIGN PATENT DOCUMENTS

| | | |
|---|---|---|
| DE | 3437379 | 4/1985 |
| WO | WO 99/56099 | 11/1999 |

OTHER PUBLICATIONS

—"A new torque transducer using stress sensitive amorphous ribbons", Harada et al; Proceedings of the Third Joint Intermag–Magnetism and Magnetic Materials Conference, Montreal, Que., Canada, Jul. 20–23, 1982; vol. MAG–18 No. 6, pp. 1767–1769; XP000606539; IEEE Transactions on Magnetics, Nov. 1982; USA; ISSN: 0018–9464; abstract Figures 1,4,5.
—"A Single Transducer for Non–Contact Measurement of the Power, Torque and Speed of a Rotary Shaft", I.J. Garshelis, et al., SAE Technical Paper Series No. 950536 published 1995 by Soc. of Automotive Engrs.

* cited by examiner

*Primary Examiner*—Edward Lefkowitz
*Assistant Examiner*—Andre Allen
(74) *Attorney, Agent, or Firm*—Robert C. Kain, Jr.; Fleit Kain

(57) ABSTRACT

The problem of magnetoelastic cirumferentially-magnetized torque transducers having a zero output magnetic field at zero torque is solved by pre-torqueing. This entails is circumferentially magnetizing the transducer element at a predetermined torque. The technique is advantageously applied to a pair of transducer elements (32, 34: 62, 64) whose outputs are combined (FIG. 6a: 76) to provide a range of measurement of torque (clockwise and counterclockwise) including zero torque. Various combinations of direction of pre-torque and direction of circumferential-magnetization are discussed. A circuit (FIG. 8) is disclosed for combining the signals to obtain a reference level (84) for gain control of the combined output signals V o from the two transducer elements (60, 62). Also disclosed is the application of the invention to other forms of torque transducer element in which a magnetic field is stored. One form is longitudinal magnetization (FIG. 10*a*). Another is radially spaced magnetization (FIG. 12*a*: FIG. 13).

31 Claims, 6 Drawing Sheets

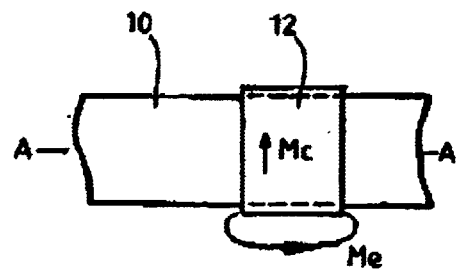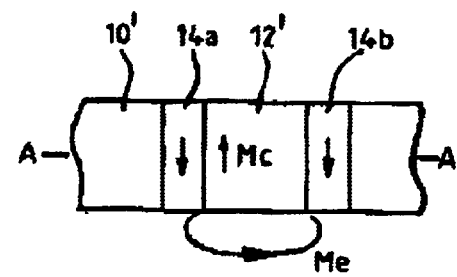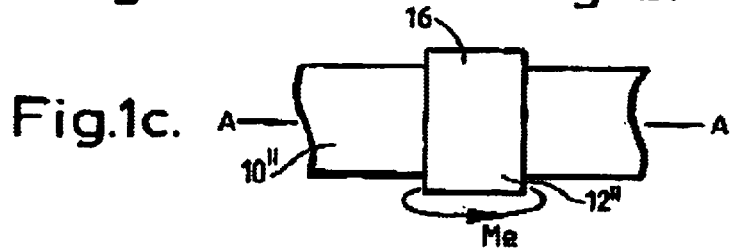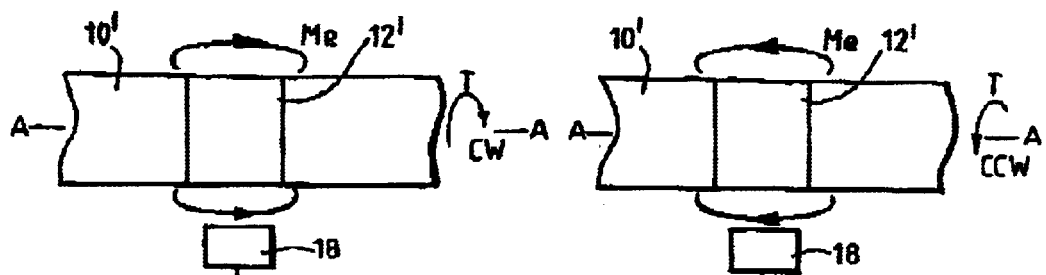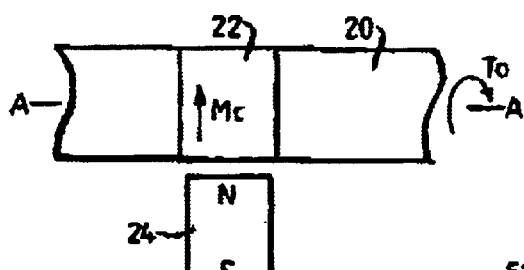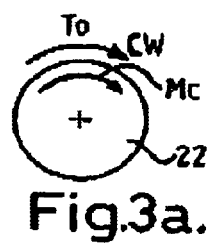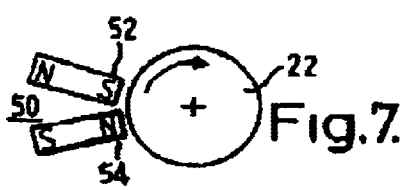

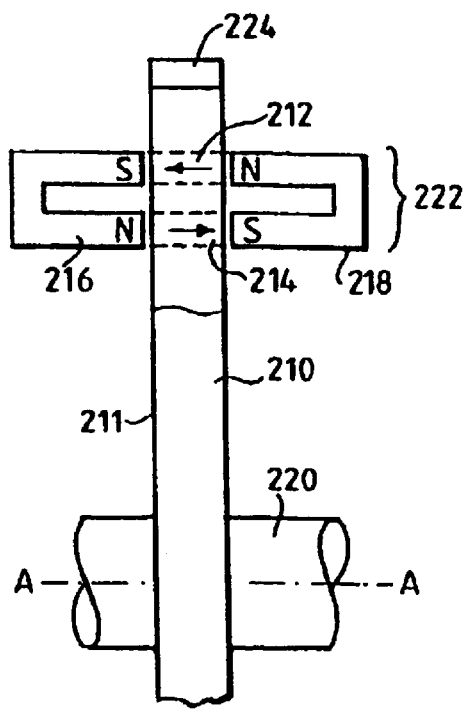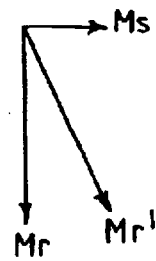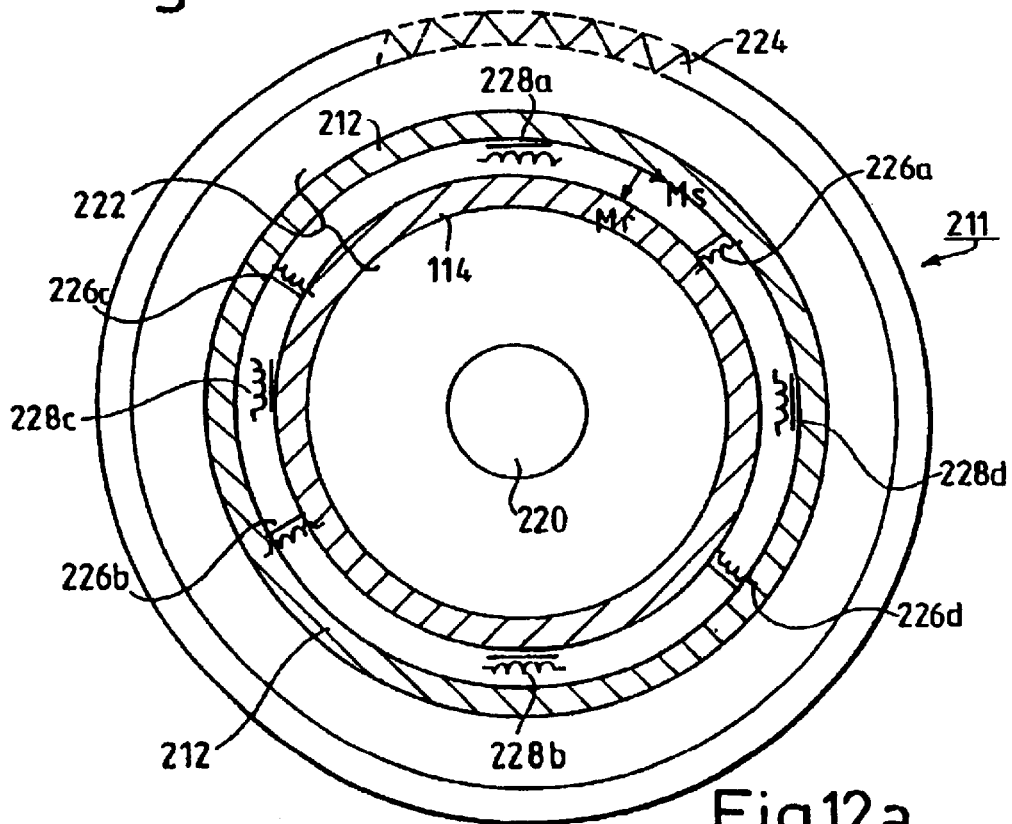

MAGNETIZED TORQUE TRANSDUCER ELEMENTS

FIELD OF THE INVENTION

This invention relates to a torque or force sensor based on a magnetised transducer element, to a magnetised transducer element and to a method of forming such an element. The invention also relates to a shaft assembly including plural transducer elements and to a torque sensor system incorporating such a shaft assembly.

The invention will be particularly described in relation to transducer elements which are of magnetoelastic material and which are circumferentially magnetised, that is are of an annular form, e.g. circular form, which is magnetised in a closed loop around the annulus. The prior art transducer elements of this type provide a zero output at zero applied torque which can present a problem in practical applications as will be explained below. However, the invention has wider application to other magnetic-based transducer elements which need not necessarily utilise the phenomenon of magnetoelasticity in generating a torque-dependent or force-dependent measurement flux. Examples of this more general class of elements are what will be called herein "longitudinal magnetisation" and "radially-spaced magnetisation".

Longitudinal magnetisation provides an annulus of magnetisation, on a torque-transmitting shaft for example, in which the magnetisation extends in an axial direction at the surface over a defined length and acts to provide a closed loop of magnetic flux within the shaft. This may be visualised as a torus of magnetic flux. This torus of flux is distorted under torque to provide a torque-dependent tangential component of magnetic field, that is a component normal to the radial direction.

Radially-spaced magnetisation is particularly applicable to disc-like parts subject to torque about the disc axis. The disc-like part is of relatively short axial thickness and has two radially-spaced annular zones, e.g. circular in the most common form, which in the limit may be contiguous. The pair of spaced zones are each longitudinally magnetised in the axial direction or each circumferentially magnetised in a closed loop about the axis. In each case a torque-dependent field is generated in a direction which is circumferential to the two zones, that is a field component that is tangential or normal to the radial direction. Transducer elements based on longitudinal magnetisation and radially-spaced magnetisations also provide an output measuring field which is zero at zero applied torque.

Longitudinal magnetisation and radially-spaced magnetisations are described further below. As already indicated, the present invention will be described particularly with reference to the known art of circumferential magnetisation transducer technology as applied to the measurement of torque.

BACKGROUND TO THE INVENTION

Transducers of the circumferentially magnetised type are disclosed in related U.S. Pat. Nos. 5,351,555 and 5,465,627 (Garshelis, assigned to Magnetoelastic Devices, Inc.) and in U.S. Pat. No. 5,520,059 (Garshelis, assigned to Magnetoelastic Devices, Inc.). These patents describe torque sensing arrangements for a rotating shaft in which a transducer ring or torus is secured to the shaft to rotate therewith and to have the torque developed in the shaft transmitted into the transducer ring. The ring is of a magnetoelastic material circumferentially magnetised and the flux emanating from the ring due to the stress of the ring under torque is detected by a non-contacting sensor system as a measure of the torque.

Another proposal is described in corresponding PCT application PCT/GB99/00736 filed 11th Mar. 1999, published under the number WO99/56099 on 4 Nov. 1999.

In this proposal a shaft of a material capable of exhibiting magnetoelastic material has a portion of it directly magnetised to support a circumferential magnetic field about the shaft axis, an approach which is contrary to the thinking in the prior art. The magnetised portion of the shaft acts directly as the torque transducer element.

To illustrate the operation of a magnetoelastic torque transducer as represented by the above two proposals reference may be made to FIGS. 1A and 1B which show a separate ring transducer element secured to a shaft and a transducer element provided by a portion of the shaft itself. The shafts rotate about the longitudinal axis A-A.

In FIG. 1a the shaft 10, assumed to be of circular cross-section, has the transducer ring 12 securely clamped on it by any of the means described in the three U.S. patents mentioned above. The transducer ring 12 supports a circumferential field $M_c$ extending around the ring. If the shaft 10 is of low magnetic permeability, e.g. paramagnetic, the ring 12 is mounted directly on the outer surface of the shaft. If shaft 10 is ferromagnetic, that is of high permeability, a low permeability spacer (not shown) is mounted between the ring and the shaft.

In FIG. 1b, the solid circular shaft 10' is of a magnetoelastic material having an integral portion 12' of it directly circumferentially magnetised to provide the transducer element (the lines delineating portion 12' are notional for clarity of illustration). As employed in previous torque sensors, with the shaft 10 or 10' static and no torque applied, the circumferential field $M_c$ is entirely contained within the transducer element 12 or 12' so that an exterior non-contacting magnetic field sensor will not detect any field emanating from the transducer element. The application of a torque causes the contained field to skew and the opposite sides of the transducer to be oppositely magnetically polarised (i.e. N-S) to generate a torque-dependent magnetic flux that links the poles externally of the transducer element to enable a magnetic sensor to detect the torque-dependent external field $M_e$. It will be understood that this external field forms a torus or doughnut around the shaft. Many different types of magnetic field sensor devices are available and many sensor arrangement configurations of field sensitive devices may be employed. In the instance illustrated in FIG. 1b, the transducer element 12' is preferably axially bounded by circumferentially-magnetised guard regions 14a and 14b, one to each side. These provide respective poles at the interface that are of opposite polarity, i.e. have a repulsive effect, to the poles of the transducer element enhancing the emanation of externally detectable magnetic field from the transducer element for measurement of torque. The circumferential fields are induced to extend as deeply into the shaft 10' as possible.

Another proposal to enhance the emanation of magnetic flux from the transducer element is to provide the transducer element portion 12" shaft 10" with an integral annular section 16 of raised profile as shown in FIG. 1C, so that the upstanding sides assist in emanating magnetic flux in an external loop. In contrast to the separate ring 12 of FIG. 1 in which all the field is confined in the ring, the annular section 16 is integral and homogeneous with the underlying shaft in FIG. 1c and the circumferential field extends into the body of the shaft. This technique and that of using guard regions is discussed more fully in the aforementioned PCT publication WO99/56099. For the purpose of description of the principles underlying the present invention, no account will be taken of the guard regions where they are used.

Referring to FIGS. 2a and 2b, when the transducer element—12' is shown as an example, it is equally applicable to separate ring 12—is subject to torque, a magnetic field $M_e$ emanates from the transducer for sensing by a sensor arrangement 18 of any desired kind. The external field has a magnitude proportional to the torque and a polarity dependent on the direction of torque T (CW or CCW) as indicated in FIGS. 2a and 2B respectively.

The problem posed to some users of magnetoelastic torque transducer elements of the circumferential magnetic field kind discussed above is that at zero torque in the shaft, the magnetic field output from the transducer element is zero. Outputs at or around the zero region are liable to be masked by noise. Another related problem with circumferential magnetisation is calibrating the transfer function of a transducer, particular in checking the long term calibration where a stored magnetic field may change, usually (weaken) over the long term. A means of checking calibration without a lengthy procedure is a desirable feature. The zero output at zero torque is also a problem with transducers employing longitudinal magnetisation and radially-spaced magnetisation. Longitudinal magnetisation has a detectable axial fringe field at zero torque upon which calibration can be based.

SUMMARY OF THE INVENTION

The present invention enables the provision of a real measurable output at zero torque with a range of linear measurement of magnetic field output against applied torque. The solution proposed by the present invention is to induce the circumferential field in the transducer element when the element is subject to a torque, a concept that will be referred to as pre-torquing. This is in contrast to prior proposals in which the establishing of the circumferential field in the transducer element is done without torque in the element. This pre-torquing of the transducer element during magnetisation may be also called processing torque.

Yet another aspect of the invention is a method of forming a transducer element in a portion of a shaft as set forth in claim 11.

A further aspect of the invention is a shaft assembly having two axially-displaced transducer elements as set forth in claim 14 and a still further aspect lies in a torque sensor system as set forth in each of claims 18 to 21.

BRIEF DESCRIPTION OF THE DRAWINGS

The invention and its practice will be further described with reference to FIGS. 3 to 7 of the accompanying drawings in which:

FIGS. 1a, 1b and 1c show examples of prior proposals for transducer elements magnetised to have a circumferential field, FIGS. 2a and 2b show an example of the emanated magnetic field for the transducer element of FIG. 1b subject to torques of opposite direction, i.e. clockwise (cw) and counter-clockwise (ccw);

FIG. 3 shows the circumferential magnetising of a transducer element under pre-torque and FIG. 3a shows the magnetising and pre-torque conditions as relating to a cross-section of the transducer element.

FIG. 7 illustrates one magnetising arrangement for obtaining circumferential magnetisation.

FIGS. 12a and 12b show a torque-transmitting, disc to which the invention is applicable, FIG. 12a showing a view of one face of the disc and FIG. 12b showing an axial section to which is added the magnetising arrangement for establishing radially-spaced annular zones of magnetisation and FIG. 12c is a magnetic vector diagram.

DESCRIPTION OF PREFERRED CIRCUMFERENTIAL MAGNETISATION EMBODIMENT

Referring to FIG. 3, a solid shaft 20 of the kind shown in FIG. 1b is seen being subject to magnetisation $M_c$ at a portion 22 while under a predetermined torque $T_o$. The magnetising method may use a permanent magnet 24 brought up adjacent to the portion 22 of shaft 20 while it is rotating under the predetermined torque $T_o$. A preferred arrangement is shown in FIG. 7. Instead of a permanent magnet, an electromagnet may be used or the shaft subjected to an axially directed current. Various methods are available and some of these are disclosed in the above three U.S. patents and particularly U.S. Pat. No. 5,520,059; and also in above-mentioned PCT publication WO99/56099. Alternatively the shaft may be held static with the predetermined torque $T_o$ applied to it while a magnet system is moved around it. Magnetisation by an axially directed current is also applicable to the static case.

FIG. 3a indicates the directions of pre-torque $T_o$ and circumferential magnetisation $M_c$ about the axis. The example shown has both of them clockwise. From FIG. 3a, it will be appreciated that their are four magnetising and pre-torque conditions—$T_o$ is CW with $M_c$ being CW or CCW; and $T_o$ is CCW with M being CW or CCW. These enable different torque response curves to be established as will now be described.

When the circumferential field $M_c$ is induced in the presence of torque $T_o$, this sets up the condition at which zero external field is produced by the transducer element. When the pre-torque is relaxed so that the shaft returns to a zero torque state, the circumferential field is skewed to a certain extent resulting in its opposite sides becoming polarised as shown in FIGS. 2a and 2b resulting in there being is a quiescent external field $M_o$ at zero torque.

Figure 4:
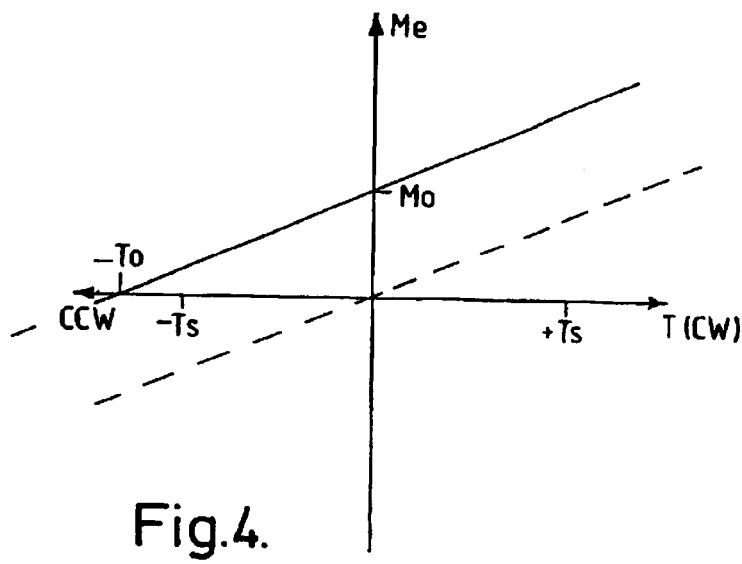
FIG. 4 shows a graph of magnetic field output ($M_e$) v. torque (T) for the circumferentially magnetised transducer element of FIG. 3 subject to a pre-torque.
Figure 5A:
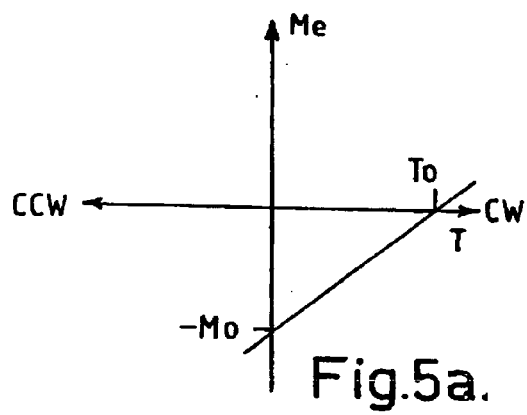
FIGS. 5a to 5d show response curves relating to different directions of pre-torquing and circumferential magnetisation.
Figure 5B:
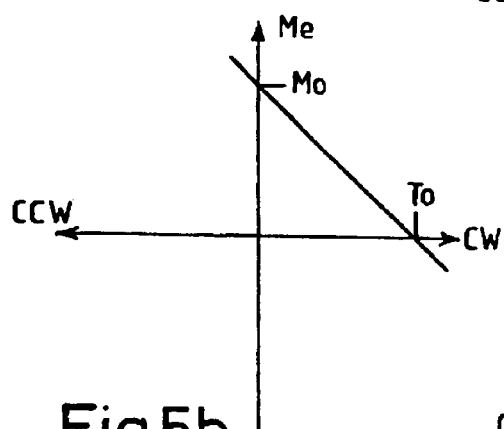
Figure 5C:
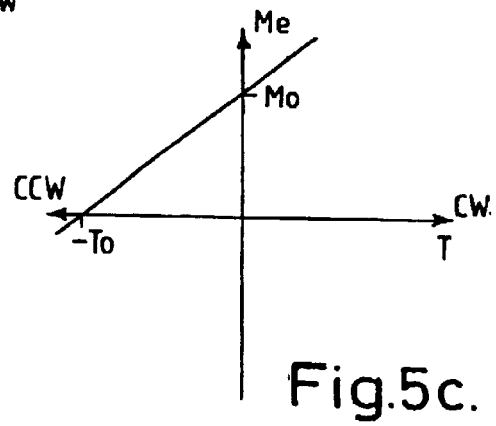
Figure 5D:
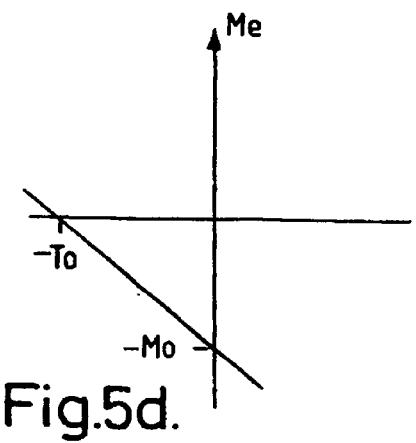

FIG. 4 illustrates the magnetic field output $M_o$ available to an external sensor as a measure of torque T for a given direction, say CW, of magnetisation. The dashed line in FIG. 4 shows the conventional case without any processing torque or pre-torque during magnetisation. The torque axis of FIG. 4 shows the output field reversing as the torque passes through zero, e.g. as the torque goes from one direction (CW) to the other (CCW). At zero torque in the conventional case the circumferential field is trapped within the transducer element and there is no external magnetic field available for sensing.

The full line A in FIG. 4 shows the effect of pre-torquing as now proposed. The zero field output is at the pre-torque value, i.e. at a know predetermined torque, here shown as $-T_o$ from a CCW pre-torque, providing a working range of torque extending from a negative value to a positive value in which the output field $M_e$ is of the same polarity so that there is no signal polarity reversal to cope with in the processing circuitry, and with a real, non-zero, field output $M_0$ at zero torque lying with a useful range of torque response. It is to be noted that the absolute axial direction of the external flux emanated for a given direction of circumferential magnetisation differs for different materials.

FIG. 4 shows one of the possible four combinations of circumferential field direction and pre-torque direction mentioned above. FIGS. 5a to 5d illustrates graphically the responses due to these four possibilities in a given shaft with clockwise and counter-clockwise directions being defined as in FIG. 3. FIGS. 5a to 5d show a set of line curves of the four responses of detectable output field ($M_e$) v. torque (T) and which may be summarised according to the following table labelled a)–d) in conformity with FIGS. 5a–d.

| Pre-Torque ($T_o$) Direction | Magnetising Field Direction | Output Field (M) (Zero Torque) | Response Slope |
|---|---|---|---|
| a) CW | CW | $-M_0$ | +ve |
| b) CW | CCW | $+M_0$ | -ve |
| c) CCW | CW | $+M_0$ | +ve |
| d) CCW | CCW | $-M_0$ | -ve |

It is to be understood that for different materials, the sign of $M_o$ and the slope may be reversed. However, the outcome is still four responses of the kind shown. These may be combined for plural transducer elements as will now be described. It will also be appreciated that any response can effectively be inverted by the processing of the electrical signals obtained from the magnetic field sensor.

It will be appreciated that the requirements for measurement of torques in shafts depend on the circumstances in which the shaft is used. For example, it may always rotate in a single direction or it may be required to rotate bi-directionally. Torque sensors may also be applied in circumstances where one end of the shaft is fixed and the other end is subject to some applied torque to be measured.

Figure 6:
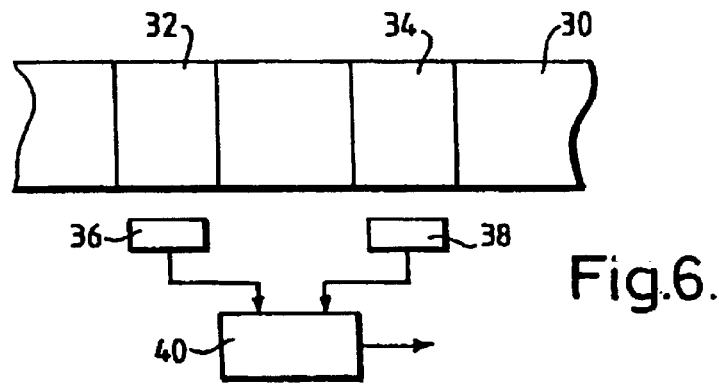
FIG. 6 shows a sensor arrangement employing two transducer elements subjected to pre-torquing, FIGS. 6a–6d graphically illustrating different responses obtainable with the two elements according to the direction of pre-torque and circumferential magnetisation respectively applied to the elements.

It is an important facet of the present proposals to apply the pre-torquing concept to obtain advantageous results from shafts having multiple axially displaced transducer elements. FIG. 6 shows a shaft 30 having two transducer elements 32 and 34 axially spaced along the shaft but subject to the same torque in the shaft. It will now be explained how an advantageous torque transducer response can be achieved by using two transducer elements with various combinations of pre-torque and circumferential magnetisation directions. Each transducer element has its output field sensed by a respective sensor arrangement 36 and 38 connected to processing circuitry 40.

One form of magnetic field sensor arrangement, using saturable inductor sensing elements, and signal conditioning circuitry for generating the output indication signal is that disclosed in published PCT application PCT/GB98/01357, publication number WO98/52063.

Figure 6A:
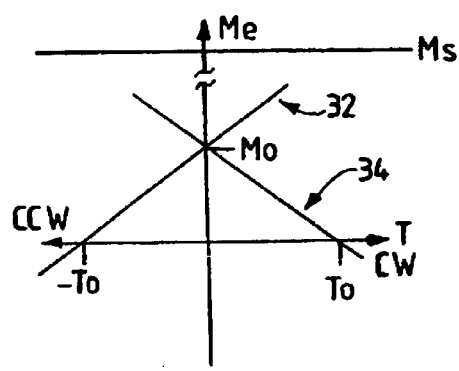
Figure 6B:
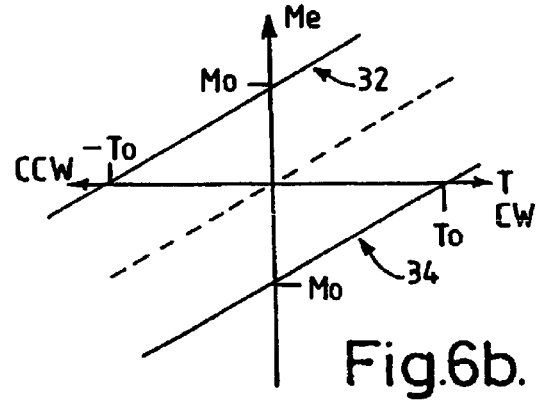

FIG. 6a shows output responses, M v T, for the two transducer elements 32, 34 being magnetised and pre-torqued in accordance with conditions 5c) and 5b—opposite polarity circumferential fields of equal strength and equal but opposite pre-torques. There will always be an output from one transducer element even when the other is in the zero output region. This avoids having to make use of a single low output signal whose signal-to-noise ratio (SNR) may be poor. FIG. 6b shows output responses, M v T, for the two transducer elements being circumferentially magnetised with the same polarity and of equal strength but with equal but opposite pre-torques—FIGS. 5b) and 5a). These outputs may be combined (summed) at 40 to give a resultant (dashed line) extending through the zero origin but with the advantage that the measurements at or near zero torque will have been made with signals of good SNR.

Figure 6C:
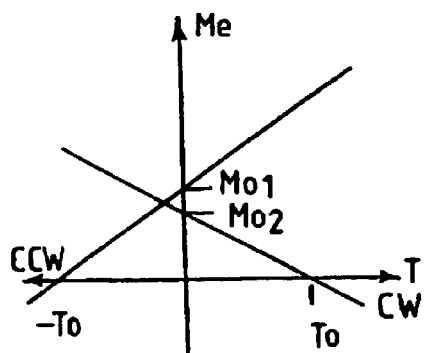
Figure 6D:
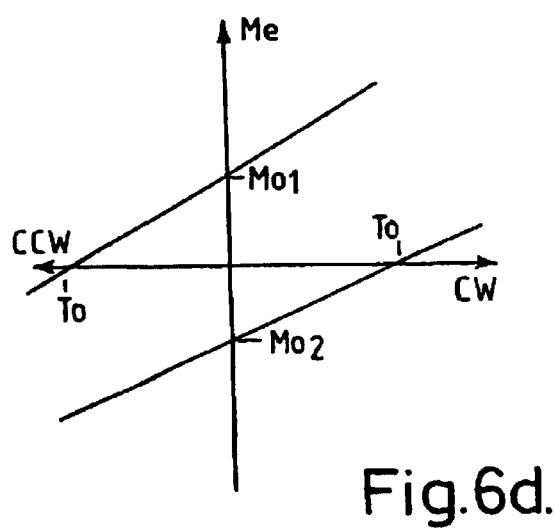

FIGS. 6c and 6d are similar to the conditions of FIGS. 6a and 6b but relate to cases where the circumferential fields in transducers 32 and 34 are of different strengths. Still more variations are readily visualized by using different magnitudes of pre-torque. The transducer elements whether they are of the kind integral with the shaft or of the separately attachable ring type have response characteristics established by any of the parameters: direction of pre-torque and its magnitude, and direction of circumferential magnetisation and its strength.

Another important use of these multiple field arrangements as the basis of an automatic gain control or calibration for a torque sensor system. Take, for example, the situation of FIG. 6a. It will be understood that if the two output signals are summed, the sum should be a constant value ($M_s$=2Mo) at all torques. Over time the circumferential fields may weaken so that if an initial sum value $M_i$ is stored as a calibration point, the later obtained instantaneous sum $M_s$ can be compared with $M_c$ and used to derive a compensating value to correct later sensor measurements.

This compensation procedure can be applied where the two fields are not equal in strength but more computation will be required.

Figure 8:
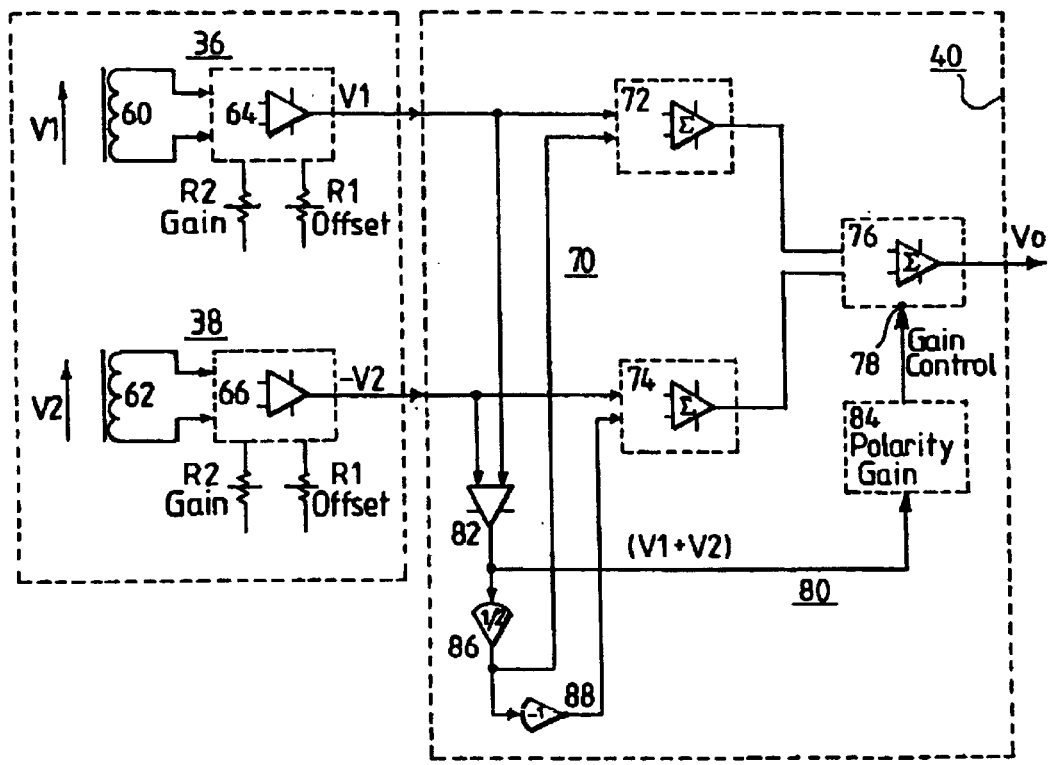
FIG. 8 is a block diagram of a sensor and processing circuit providing automatic gain control.

In order to better explain the application of automatic gain control or compensation, reference is made to FIG. 8 which shows a block diagram of a sensor and signal processing circuit for an arrangement broadly in accord with FIG. 6 to implement a measurement response of the kind illustrated in FIG. 6b using the inversion of one sensor signal to obtain a reference value such as indicated by $M_s$ in FIG. 6a. The example to be illustrated has transducer regions 32 and 34 magnetised in accord with the responses of FIGS. 5c and 5a respectively, namely, opposite but equal magnitude pre-torques and the same circumferential field direction, and of equal strength.

Referring to FIG. 8, it shows an analogue processing circuit 40 for processing the signals from sensors 36 and 38 of FIG. 6. The sensors 36 and 38 are illustrated as single coil sensors 60 and 62 respectively with which is included a respective driver and control circuit and respective buffer amplifiers 64 and 66. The manner in which coil-type magnetic field sensors are employed in transducer systems and a specific circuit for this purpose are disclosed in PCT application GB98/01357 published under the number WO98/52063. Each of the buffer amplifiers 64 and 66 has associated with it a means for adjusting the amplifier gain, assumed to be nominally unity, and the amplifier offset. The sensors 60 and 62 have respective voltages $V_1$ and $V_2$ induced in them. The sensors are mounted to have the voltages $V_1$ and $V_2$ induced in the same sense and to have any signal due to the earth's magnetic field or other extraneous field induced in the same sense. Thus each of $V_1$ and $V_2$ is in practice the resultant of the torque dependent magnetic flux sensed thereby and any extraneous unwanted flux.

In one of the sensors, 38, the input signal is inverted so that the buffer amplifiers produce output signals $V_1$ and $-V_2$ for further processing. The response curves at this point are now equivalent to FIG. 6a. The circuit 40 comprises a main signal path 70 and an automatic gain control loop 80. The circuit is designed to combine the signals $V_1$ and $V_2$ to provide an output voltage $V_o$ following the torque-dependent dash line curve in FIG. 6b, i.e. $V_o=V_1-V_2$ in the ideal case. It will be noted from FIG. 6b that $V_1$ and $V_2$ are of equal magnitude, follow torque curves of equal slope, one increasing linearly with torque T from the zero torque point and the other decreasing linearly with torque T from that point.

In the main signal path 70, the voltages $V_1$ and $-V_2$ are applied to inputs of respective summing amplifiers 72 and 74 of equal (unity) gain. Each amplifier has a second input receiving a signal whose derivation is described below. The output of amplifiers 72 and 74 are applied as inputs to an output summing amplifier 76 to provide the output $V_o$. Amplifier 76 is a gain controlled amplifier having an input 78 for receiving a gain control signal from the gain control path 80.

The automatic gain control (AGC) loop includes a difference amplifier 82 to which the voltages $V_1$ and $-V_2$ are applied to thereby obtain a reference signal which is a sum signal $(V_1+V_2)$ providing, in the ideal case, a constant value signal across the torque range equivalent to $M_s$ in FIG. 6a. This sum signal is applied through block 84 to develop a signal at appropriate level to control the gain of summing amplifier 76 in accord with an initialising procedure discussed further below. The action of this forward gain control loop is further described below.

The output of difference amplifier is divided-by-2 at 86 and the output is passed directly to a second input of amplifier 72 and via an inverter 88 to a second input of amplifier 74 to re-enter the main signal path.

The operation of the circuit 40 is as follows.

The signals applied to the two inputs of amplifier 72 are V1 and a signal derived from the summation of $V_1$ and $V_2$ in the AGC loop 80. The signals applied to the two inputs of amplifier 74 are $-V_2$ and the same second signal as applied to amplifier 72, but inverted. The signals applied to the inputs of amplifier 76 from amplifiers 72 and 74 are summed subject to a gain control to provide an output $$V_o=k\ (V_1-V_2).$$

It is worth noting here that the sensor devices 60 and 62 were so arranged that any induced signal components, such as from the earth's magnetic field were in the same sense with respect to $V_1$ and $V_2$ so that these components will be cancelled from the final output.

The sensor circuits 36, 38 and the processing circuit 40 are initially set up so that the output $V_o$ represents the desired dashed line response of FIG. 6b by combining the $V_1$ and $V_2$ responses as a function of torque, e.g. the responses 32 and 34 of FIG. 6b.

It will be understood that the compensation techniques discussed above could be implemented in software. For example, the sensor output signals $V_1$ and $V_2$ may be digitised and the functions of the signal processing circuit 40 implemented on the digitised signals using software routines.

One of the potential problems with circumferential magnetic fields, such as 32 and 34, is that they may weaken over time. Thus for the same torque values, lesser values of $V_1$ and $V_2$ will be obtained. The initialising procedure may make use of the magnetisation established under the pre-torque values (FIG. 6b). The sum of $V_1$ and $V_2$ at the sensor buffer output can be identified with a specific torque value— $2T_o$—in this example and thus with a torque measurement sensitivity (volts/Nm). The offset and gain (slope) resistors R1 and R2 associated with the sensor buffer amplifiers provide a means of ensuring that the sum $(V_1+V_2)$ to be used as a reference is constant across the range of torque measurement. Later changes in the summation $(V_1+V_2)$, such as weakening of the transducer region fields, is then compensated by adjusting the gain of amplifier 76 (i.e. the factor "k") by means of the AGC loop 80. This sets the gain or scaling factor of the amplifier 76. The loop can also act to compensate perturbations in the $V_1$ and $V_2$ signals during, for example, rotation of a shaft whose torque is being measured. This compensation can be afforded on a real-time basis as the shaft is rotating.

The system can compensate for the effect of temperature changes on the basic sensor sensitivity. It can compensate for changes in the distance between the magnetic field sensor and the shaft as the shaft rotates. Generally, aging effects, e.g. leaching away of the transducer region fields will be compensated to maintain the initial torque sensitivity.

Reverting to the magnetising arrangement indicated at 24 in FIG. 3, a more preferred arrangement is seen in FIG. 7 which shows a cross-section through the portion 22 to be magnetised A pair 50 of opposite polarity magnets have respective ends 52, 54 adjacent the shaft but a little spaced to generate a field between them having an essentially circumferential direction and through which the circumference of the shaft is rotated.

The practice of the invention has so far been described with reference to circumferential magnetisation. Embodiments will now be described which utilise the above-mentioned longitudinal and radially spaced magnetisation, assuming transducer elements of ferromagnetic material.

Longitudinal Magnetisation Embodiments

The nature of longitudinal magnetisation has been outlined above. The techniques taught above for a circumferentially magnetised transducer element are also applicable to a longitudinally magnetised transducer element or a pair of such elements.

Figure 9:
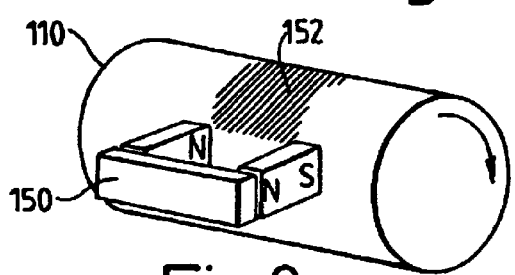
FIG. 9 shows the creation of a zone of longitudinal magnetisation in a portion of a shaft.
Figure 10A:
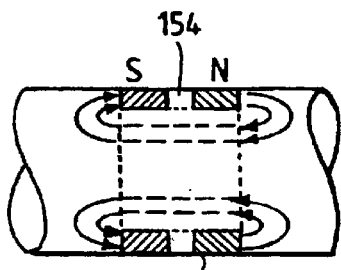
FIG. 10a illustrates the toroidal form of magnetic flux in the longitudinal magnetised zone.

FIG. 9 shows how an annulus of longitudinal magnetisation is applied to an integral portion of a shaft. The portion is to provide a transducer element and it at least is of magnetic material. In FIG. 9 a shaft 110 of magnetic material is rotated about its axis so that a portion 152 of it is magnetised by the axially-spaced north-south poles NS of a magnet arrangement 150. This may be conveniently an electromagnetic which enables the magnetisation to be readily controlled. The magnet system may be moved about the shaft. The result of this magnetisation is to produce an annular zone of surface magnetisation 154 as shown in FIG. 10a having NS poles as indicated. It extends as an annulus about the shaft axis having the remanent magnetisation of the same polarity around the axis of the shaft and axially-directed. As indicated, the annular magnetisation tends to form a closed flux path within the shaft interior to annulus 154 so that a toroid of magnetic flux is established about the shaft axis. What is important is the magnetic field detectable exteriorly of the shaft as will be shortly explained.

Figure 10B:
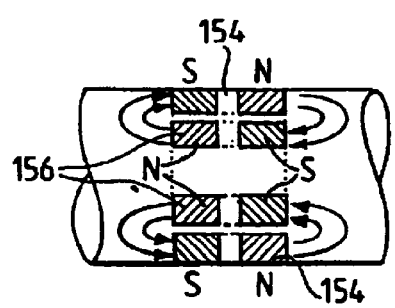
FIG. 10b illustrates the toroidal form of magnetic flux established by a two-step magnetisation process.

The toroidal flux concept can be enhanced as is shown in FIG. 10b which shows a surface adjacent annular magnetised zone 154 within which an interior annular magnetised zone 156 of opposite polarity is established. The two zones combine as shown to provide the torus of closed loop magnetic flux. The magnetisation is obtained by a two-step procedure. Firstly a deep annular region of the polarity of zone 156 is formed by the magnet 150. Then the surface adjacent zone 154 is formed by reversing the magnetisation polarity of surface adjacent region of the deep region.

Figure 11A:
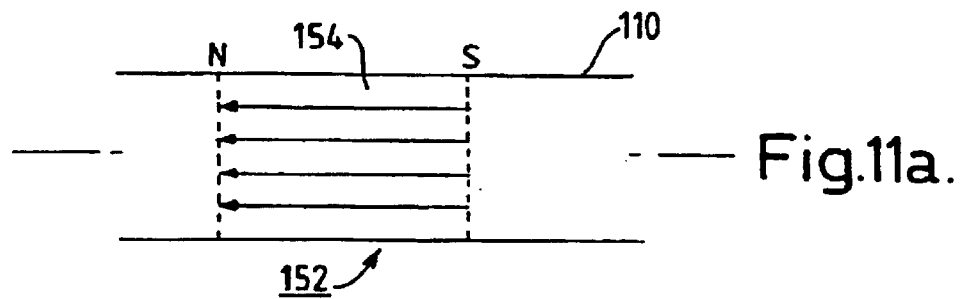
FIGS. 11a and 11b illustrate the generation of a torque-dependent magnetic field vector component with a longitudinally magnetised transducer element in the absence of pre-torquing in accord with the invention, with the element under zero torque and under torque respectively

Turning to the practical utilisation of the resultant transducer element, reference is made to FIG. 11a which shows the magnetic field of zone 154 as seen at the surface of the shaft in the absence of torque. The arrow Mf indicates a fringing field which will extend generally in the axial direction between the poles of region 154 in the ambient medium usually air.

Figure 11B:
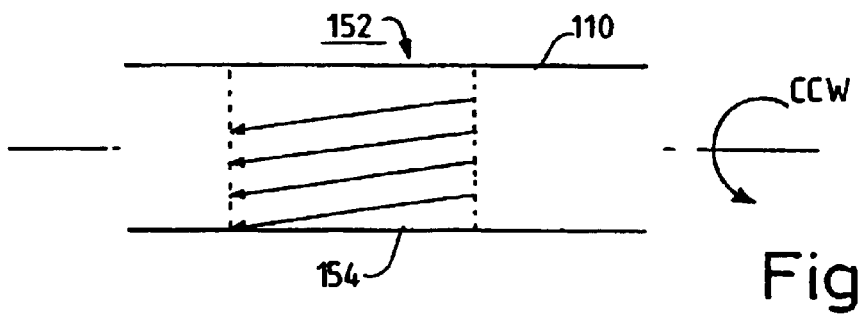
Figure 11C:
FIG. 11c is a magnetic vector diagram.

FIG. 11b shows the effect of putting the shaft, and thus transducer element portion 152, under torque in one direction about the axis of shaft 110. The longitudinal field in zone 154 is skewed as shown by the arrows (the skew is exaggerated for clarity of illustration). The external fringing field is likewise skewed or deflected as represented by magnetic vector Mf' (FIG. 11c). Also generated is a vector component Ms which in this embodiment extends circumferentially about the circumference of shaft 110. The component Ms is tangential to the shaft at any point, that is perpendicular to the local radius. It is the Ms component that provides the component for measuring torque by means of an appropriate oriented magnetic field sensor or group of sensors. Ms is a function of torque. If the torque is in the opposite direction the direction of Ms is reversed. At zero torque, Ms has a zero value. This results in the same problem as already described for circumferential magnetisation, namely the difficulty of measurement at zero or near zero torque.

The solution adopted is the same as for circumferential magnetisation, namely that of pre-torquing the shaft portion 152 while establishing the magnetisation of it so that on allowing the shaft to relax to zero torque, the quiescent field is skewed with a detectable Ms component. This technique can be extended to more than two longitudinally magnetized regions as taught above in respect of circumferentially magnetised regions.

Radially-Spaced Magnetisation

The principles given above can be applied to radially-spaced magnetisations which find particular, though not exclusive, application in torque transmitting discs.

FIGS. 12a and 12b show a face view and an axial section of a disc 210 which is mounted on a shaft 220 for rotation about its axis A-A and carries, for example, a gearing 224 at its outer periphery for enabling transmission of torque through the disc. Also shown is the provision of a magnet system comprising magnets 216 and 218 on opposite sides of the disc to establish two magnetised zones 212 and 214. Each zone is established as an annulus about the axis A-A, as by rotating the disc between the magnets. Each zone is longitudinally magnetised in that the magnetisation extends in the axial direction and the two zones 212 and 214 have opposite polarities of magnetisation. The two magnetised zones provide a transducer element 222 (the magnets 216, 218 being removed) which from face 211, say, appears as in the segment of the disc shown in FIG. 12a. At the surface 211 zone 212 provides an annular pole (N) of one polarity and zone 214 an annular pole (S) of the opposite polarity between which an exterior magnetic flux Mr (FIG. 12c) is established to link the poles. The exterior magnetic field vector is radial at any point around the annuli. Under torque the vector is deflected or skewed from the radial to a position Mr' to provide a circumferential or tangential component Ms which extends around the annulus. Ms is a function of torque having a zero value at zero torque unless the teachings of the present invention are adopted. Thus as in the earlier described embodiments, the magnetised zones 212 and 214 are established while torque is applied (pre-torquing) so that a detectable value of Ms is generated when the disc is relaxed to a zero torque state.

FIG. 12a also shows sensors 228a–228d for detecting the circumferential component $M_s$ and sensor 226a–226b for detecting the radial component Mr used as a reference.

Figure 13:
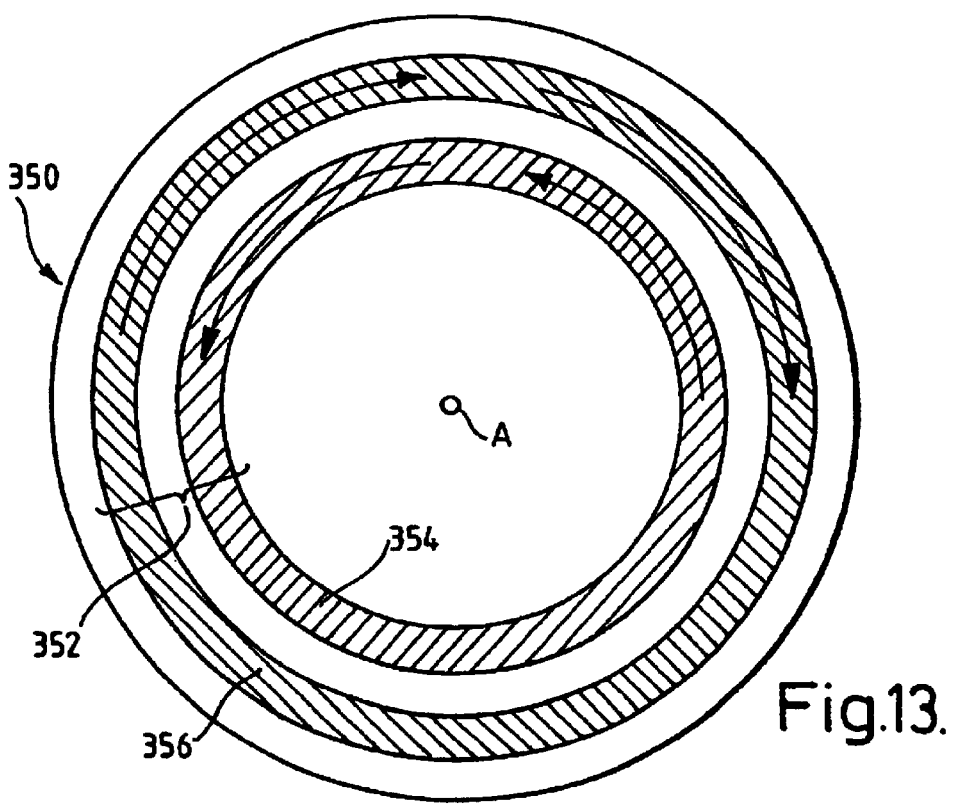
FIG. 13 shows a view of one face of a modification of the disc arrangement of FIGS. 12a and 12b for circumferentially-magnetised annular zones.

FIG. 13 illustrates how the disc-like torque transducer assembly can be adapted to work with circumferential magnetisation. FIG. 13 is a face view of a disc 350 through which torque is transmitted between a drive applied on the axis A and the periphery or vice versa as previously described. In this embodiment, there is a transducer region 352 which comprises an inner annular region 354 and an outer annular region 356. The regions 354 and 356 have opposite polarities of magnetisation as indicated by the respective arrows. The circumferential magnetisation may be applied through the face 358 using a magnet arrangement of the kind shown in FIG. 7.

In the absence of torque the circumferential fields in regions 354 and 356 will be trapped within the annular regions. However, under torque the fields become skewed in the manner well-known with prior art circumferential transducers, e.g. Garshelis U.S. Pat. Nos. 5,351,555, 5,520,059 and 5,465,627. The consequence is that at face 358 the regions 354 and 356 develop magnetic poles of opposite polarity. The polarity is dependent on the direction of torque.

A radial measurement field Ms is generated externally of the surface 358 between regions 354 and 356, the radial magnetic flux being a function of torque. The radial flux can be sensed by sensors disposed as for the radial (reference) flux in FIG. 12a, e.g. sensors 226a–d. In contrast to FIG. 12a it is seen that the detectable torque-dependent flux is radial, rather than circumferential, but there is no reference field component available.

The above modification also suffers from having a zero field ms at zero torque unless the circumferential fields are established in regions 354 and 356 by pre-torquing the disc while establishing the fields in accord with the teaching given above.

What is claimed is:

1. A transducer element of a magnetic material for a torque or force sensor which comprises:
    at least one annulus of magnetised material extending about an axis,
    the at least one annulus being magnetised to establish a closed loop of magnetic flux in the magnetic material,
    the at least one annulus being responsive to a torque applied about said axis for a torque sensor or to a bending moment acting about said axis due to an applied force for a force sensor to emanate a magnetic field component externally of said element that is a function respectively of the applied torque or the applied force, the magnetisation established in the at least one annulus emanating said magnetic field component to have a significant non-zero value at zero torque or force and an essentially zero value at a non-zero torque or force.

2. A transducer element as claimed in claim 1 in which the at least one annulus is in the form of an annular ring attachable to a shaft, and the annular ring is of a magnetoelastic material and is circumferentially magnetised.

3. A transducer element as claimed in claim 1 in which the at least one annulus is of magnetoelastic material and is a circumferentially magnetised, integral portion of a shaft.

4. A transducer element as claimed in claim 1 in which the at least one annulus is longitudinally magnetised in the direction of said axis.

5. A transducer element as claimed in claim 4 in which the at least one annulus is an integral portion of a shaft.

6. A transducer element as claimed in claim 3 comprising a first annulus of magnetised material and a second annulus of magnetised material, wherein said first annulus emanates an essentially zero value of magnetic field component at a non-zero value of torque or force of a given polarity and said second annulus emanates an essentially-zero value of magnetic field component at a non-zero value of torque or force of the opposite polarity.

7. A transducer element as claimed in claim 5 comprising a first annulus of magnetised material and a second annulus of magnetised material, wherein said first annulus emanates an essentially zero value of magnetic field component at a non-zero value of torque or force of a given polarity and said second annulus provides an essentially-zero value of magnetic field component at a non-zero value of torque or force of the opposite polarity.

8. A transducer element of a magnetic material for a force or a torque sensor wherein the element has an axis about which a torque is applicable or about which a bending moment is impressible due to an applied force, the transducer element comprising: a surface extending radially of said axis, a first annulus of magnetisation extending to said surface and a second annulus of magnetisation extending to said surface radially outwardly of said first annulus, said first annulus and said second annulus being magnetised to emanate a magnetic field component therebetween externally of said surface which has a significant non-zero value at zero value of applied torque or force and an essentially zero value at a non-zero value of applied torque or force.

9. A transducer element as claimed in claim 8 in which said first annulus is magnetised in the direction of said axis with a pole of given polarity at said surface and in which said second annulus is magnetised in the direction of said axis with a pole of opposite polarity at said surface.

10. A transducer element as claimed in claim 8 in which said first annulus and said second annulus are each magnetised to form a respective closed loop of circumferential magnetisation, and the respective closed loops of circumferential magnetisation are of opposite polarity.

11. A transducer element as claimed in claim 5 in which the at least one annulus comprises a first annulus of magnetisation located adjacent an exterior surface of the transducer element and a second annulus of magnetisation located radially inwardly of the first annulus of magnetisation, said first annulus and said second annulus being longitudinally magnetised in the axial direction with opposite of magnetisation to form a closed loop of magnetic flux.

12. A transducer assembly comprising a transducer element as claimed in claim 11 and a magnetic sensor arrangement oriented to detect said magnetic field component.

13. A transducer assembly comprising a transducer element as claimed in claim 12 and a respective magnetic sensor arrangement for the at least one magnetised annulus and oriented to detect a magnetic field component in the direction of said axis.

14. A transducer assembly comprising a transducer element as claimed in claim 4 and a respective magnetic sensor arrangement for the at least one magnetised annulus and oriented to detect a magnetic field component in the circumferential (tangential) direction about said axis.

15. A transducer assembly comprising a transducer element as claimed in claim 6 and first and second magnetic sensor arrangements oriented for detecting a respective magnetic field component in the direction of said axis emanated by said first annulus and by said second annulus.

16. A transducer assembly comprising a transducer element as claimed in claim 7 and first and second magnetic sensor arrangements oriented for detecting a respective magnetic field component in the circumferential (tangential) direction about said axis emanated by said first annulus and by said second annulus.

17. A transducer assembly comprising a transducer element as claimed in claim 8 and a magnetic sensor arrangement oriented to detect said magnetic field component emanated between said first annulus and said second annulus.

18. A transducer assembly comprising a transducer element as claimed in claim 9 and a magnetic sensor arrangement located to be responsive to the magnetic field between said first annulus and second annulus and oriented to detect a magnetic field component in the circumferential (tangential) direction about said axis.

19. A transducer assembly comprising a transducer element as claimed in claim 10 and a magnetic sensor arrangement oriented to detect a radially directed magnetic field component between said first annulus and said second annulus.

20. A torque sensor system comprising a transducer assembly as claimed in claim 15 responsive to torque applied about said axis, wherein said first and second magnetic field sensor arrangements provide first and second torque-dependent signals respectively, and further including signal processing means which comprises a first channel responsive to at least one of the first and second torque-dependent signals, said first channel comprising an output means having a controllable gain for producing an output signal representing a measure of torque, and which also comprises a second channel comprising means for combining tie first and second torque-dependent signals to provide a reference signal, said output means being responsive to said reference signal to adjust its gain in a sense acting to eliminate changes in the response relating the first and second torque-dependent signals with torque.

21. A torque sensor system as claimed in claim 20 in which the combining means is operable to effect a difference operation on said first and second torque-dependent signals.

22. A torque sensor system as claimed in claim 21 which the first channel is responsive to both of said first and second torque-dependent signals to effect a summing operation thereon.

23. A method of forming a transducer element for the measurement of torque or force comprising:

providing a body of magnetisable material having an axis;
applying a torque to said body about said axis, maintaining the applied torque while applying a magnetic field to remanently magnetise a region of said body that is annular about said axis whereby the annular region emanates a torque-dependent component of magnetic field which has a significant non-zero value at zero torque.

24. The method of claim 13 in which the annular region of said body is remanently magnetised to have circumferential magnetisation and said torque-dependent component is in the direction of said axis.

25. The method of claim 13 in which the annular region of said body is remanently magnetised in the direction or said axis and said torque-dependent component is in the circumferential (tangential) direction with respect to said axis.

26. A method of forming a transducer element for the measurement of torque or force comprising:

providing a body of magnetisable material having an axis;

applying a first torque lo said body about said axis, maintaining the applied first torque while applying a first magnetic field to remanently magnetise a first region of said body that is annular about said axis, applying a second torque to said body about said axis, maintaining the second torque while applying a second magnetic field to remanently magnetise a second region of said body that is annular about said axis, and relaxing the second torque.

27. The method of claim 26 wherein said first region and said second region are spaced axially, each region being remanently magnetised to emanate a respective torque-dependent magnetic field component that has a significant non-zero value at zero torque.

28. The method of claim 27 wherein each of the first and second regions is remanently magnetised to have a respective circumferential magnetisation and the respective torque-dependent magnetic field component emanated thereby is in the direction of said axis.

29. The method of claim 27 wherein each of the first and second regions is remanently magnetised in the direction of said axis and the respective torque-dependent magnetic field component emanated thereby is in the circumferential (tangential) direction with respect to said axis.

30. The method of claim 26 wherein the annular second region is radially outward of the annular first region, and each of the first and second regions is remanently magnetised in the direction of said axis, the first and second regions being magnetised to have opposite polarities of magnetisation.

31. The method of claim 30 wherein the annular second region is remanently magnetised to emanate a torque-dependent magnetic field component in the circumferential (tangential) direction that has a significant non-zero value at zero torque.

* * * * *